Aug. 19, 1941.        M. H. SAVAGE ET AL        2,253,138

ELECTRICAL CABLE

Filed July 29, 1938

Fig. 1.

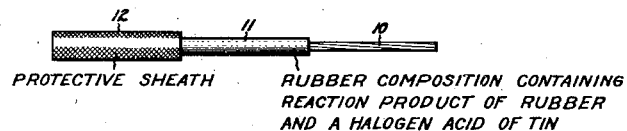

PROTECTIVE SHEATH     RUBBER COMPOSITION CONTAINING REACTION PRODUCT OF RUBBER AND A HALOGEN ACID OF TIN

Fig. 2.

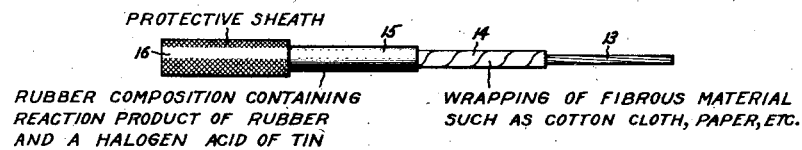

PROTECTIVE SHEATH

RUBBER COMPOSITION CONTAINING REACTION PRODUCT OF RUBBER AND A HALOGEN ACID OF TIN     WRAPPING OF FIBROUS MATERIAL SUCH AS COTTON CLOTH, PAPER, ETC.

Fig. 3.

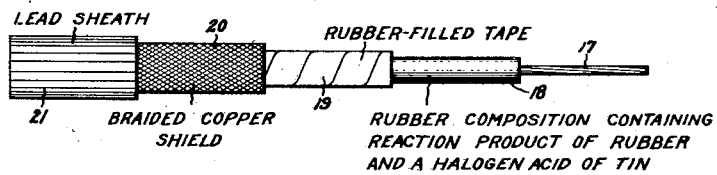

LEAD SHEATH     RUBBER-FILLED TAPE

BRAIDED COPPER SHIELD     RUBBER COMPOSITION CONTAINING REACTION PRODUCT OF RUBBER AND A HALOGEN ACID OF TIN

Fig. 4.

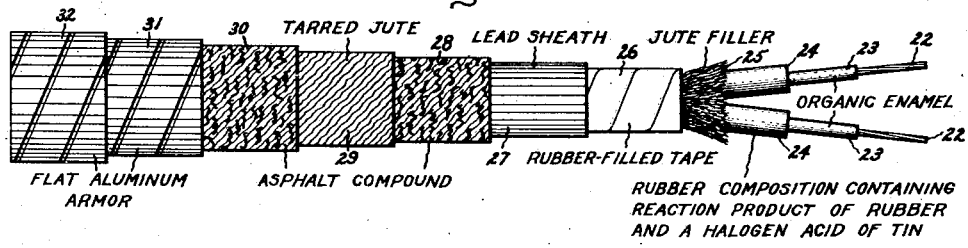

TARRED JUTE     LEAD SHEATH     JUTE FILLER

ORGANIC ENAMEL

FLAT ALUMINUM ARMOR     ASPHALT COMPOUND     RUBBER-FILLED TAPE     RUBBER COMPOSITION CONTAINING REACTION PRODUCT OF RUBBER AND A HALOGEN ACID OF TIN

Inventors:
Manuel H. Savage,
Edmund J. Butler,
by Harry E. Dunham
Their Attorney.

Patented Aug. 19, 1941

2,253,138

UNITED STATES PATENT OFFICE 2,253,138

ELECTRICAL CABLE

Manuel H. Savage, Bridgeport, and Edmund J. Butler, Stratford, Conn., assignors to General Electric Company, a corporation of New York Application July 29, 1938, Serial No. 221,957

18 Claims. (Cl. 174—120)

The present invention relates to electrical cables. It is concerned more particularly with insulated electrical cables having as insulation a novel insulating composition which is flexible, is high in dielectric strength, in resistivity and in resistance to water absorption, and is low in power factor and in specific inductive capacitance. The cables of this invention are especially adapted for use for submarine communication and power applications and in high frequency transmission lines and feeders.

The novel features which are characteristic of our invention are set forth in the appended claims. The invention, itself, however, will best be understood from the following detailed description thereof and the accompanying drawing forming a part of this application, in which Fig. 1 is a fragmentary view in elevation of a cable of the single-conductor type constructed in accordance with our invention;

Figs. 2 and 3 are similar views of modified constructions of single-conductor cables embodying the invention; and Fig. 4 is a view similar to Fig. 1 of a multiconductor cable embodying the invention.

For manufacturing certain types of electrical cables, for example submarine cables, it long has been desirable to produce an extrudable rubber insulating composition comprising high percentages of rubber, specifically deproteinized natural rubber. However, when the rubber content is materially increased, the mass becomes so plastic that the compound is difficult to extrude and does not have sufficient rigidity to insure the wire remaining accurately centered prior to and during vulcanization. This lack of rigidity tends to persist in the vulcanized rubber, resulting in deformation of the insulation, especially in multi-conductor cables, with obvious disadvantages.

We have discovered that low loss, high dielectric strength insulated conductors can be made with none of the processing difficulties heretofore encountered by incorporating into a rubber composition a reaction product of rubber and a halogen acid of tin, as for example hydrated chlorostannous acid ($HSnCl_3.3H_2O$) or hydrated chlorostannic acid ($H_2SnCl_6.2H_2O$). Such reaction products are described in Bruson Patent No. 1,797,188 and are produced and sold by the Goodyear Tire and Rubber Company, Akron, Ohio, under the trade name of "Pliolite."

As described in the aforementioned Bruson patent, rubber can be reacted with halogen acids of tin to form a halogenated mixture of polymers and degradation products of rubber. To obtain such a reaction product, a suitable amount of a halogen acid of tin, for example about 10 per cent of chlorostannic acid, is dispersed in rubber, for example by milling the two together upon conventional rubber rolls. The resulting product is heated at an elevated temperature until a reaction product has formed between the rubber and the chlorostannic acid, for instance for approximately 2 to 5 hours at about 130° to 150° C. Instead of incorporating the chlorostannic acid in the rubber by milling the two together, it may be added to a solution of rubber in a solvent such as benzene and reacted at boiling temperature, thereafter evaporating the solvent. Also, if desired, hydrated chlorostannous acid may be used in place of hydrated chlorostannic acid, or the bromostannic or bromostannous acids may be employed in place of the chloro derivatives of tin.

In carrying our invention into effect, it is convenient to mix the above reaction product with natural or synthetic rubber and to use this mixture (designated, generally, hereafter as "modified rubber") in preparing our new insulating compositions. This mixture advantageously comprises approximately equal percentages, by weight, of rubber-tin-halogen reaction product and rubber. Preferably, the reaction product is one obtained by treating rubber with hydrated chlorostannic acid as previously described.

In producing an insulating composition for use in insulating submarine cables and other cables exposed to high moisture conditions, the above modified rubber is deproteinized. Advantageously this is done in accordance with the method described in the co-pending application of Emil Schwartz and Evan T. Croasdale, Serial No. 147,990, filed June 12, 1937, now Patent No. 2,146,597 and assigned to the same assignee as the present invention. This deproteinization treatment removes not only the proteins and other water-soluble ingredients from the rubber component of the mass, but also removes excess halogen acid of tin and other soluble impurities which may be present in the rubber-tin-halogen reaction product.

The rubber insulating composition of this invention comprises deproteinized or non-deproteinized natural rubber, or if desired synthetic rubber may be used; the above-described rubber-tin-halogen reaction product; asphalt, within which term is included air-blown asphalt, gilsonite, mixtures of air-blown asphalt and gilsonite, or other petroleum or natural asphalts commonly used in rubber compounds; and a suitable vulcanizing agent as, for example, sulfur, selenium or the like. Besides lowering the cost, the asphalt improves the electrical properties and the tubing characteristics of the compound. It also aids in eliminating the tendency of high rubber content compositions to form a rough surface when extruded upon a wire. Generally, the composition also contains one or more suitable vulcanization accelerators and a suitable accelerator activating agent which, depending upon the proportions employed, also may function as a reinforcing agent. The activating agent conveniently may be, for instance, zinc compounds such as zinc oxide, zinc carbonate, mixtures of zinc oxide and zinc carbonate, magnesium carbonate, etc. Preferably, the composition also contains a suitable anti-oxidant and a suitable plasticizer.

The amount of rubber-tin-halogen reaction product in the composition should not be so high that the mass cannot be extruded about a conducting core at a suitable operating temperature, for instance at a temperature of the order of 175° to 225° F. In most cases the proportion of rubber-tin-halogen reaction product in the unvulcanized composition will be less than 60 per cent by weight of the total rubber and, preferably, is less than 50 per cent by weight thereof. More particularly, it may be stated that we prefer that the new insulating composition be formed of the following ingredients within the limits stated:

| | Per cent by weight |
|---|---|
| Rubber, preferably deproteinized or non-deproteinized natural rubber | 25 to 55 |
| Modified rubber (50% rubber and 50% product of reacting rubber with halogen acid of tin, specifically with hydrated chlorostannic acid)—Deproteinized or non-deproteinized | 50 to 20 |
| Asphalt, preferably asphalt having a melting point of about 260° to 350° F. (ball and ring method) | 5 to 20 |
| Vulcanizing agent, preferably sulfur | 0.5 to 2 |
| One or more vulcanization accelerators | Up to 5 |
| Accelerator activating agent, preferably zinc oxide, zinc carbonate or mixtures thereof | Up to 7 |
| Anti-oxidant | Up to 2 |
| Plasticizer | Up to 5 |

In the above formula it will be noted that when the rubber content of the modified rubber is added to the amount of unmodified rubber the total amount thereof is from 50 to 65 per cent and the amount of the reaction product of rubber with halogen acid of tin is from 25 to 10 per cent.

As anti-oxidants we may use, for example, materials known under the trade names of "Neozone D," "Neozone E," "Antox," "B. L. E.," etc. "Neozone D" is phenyl-beta-naphthylamine; "Neozone E" consists of about 75 per cent phenyl-beta-naphthylamine and about 25 per cent meta-toluylenediamine oxalate; "Antox" is a butyraldehyde-aniline derivative; and "B. L. E." is a ketone-amine reaction product. Generally we use from 0.5 to 2 per cent of an anti-oxidant.

Examples of plasticizers which may be used are stearic acid, zinc laurate, vegetable oils such as palm oils, China-wood oil, linseed oil, etc., mineral oils, waxes (for instance, ozokerite, paraffin, etc.), and similar substances. We prefer to use as plasticizer a mixture of ozokerite and zinc laurate, as for example from 1 to 4 parts by weight ozokerite to from 0.2 to 0.3 part by weight zinc laurate.

As vulcanization accelerators we may use, for example, inorganic accelerators such as litharge, or organic acceleraotrs as, for instance, diphenyl guanidine or materials known under the trade names of "Captax" (mercaptobenzothiazole), "Altax" (oxidation product of "Captax"), "Thionex" (tetra methyl thiuram monsulfide), "Zenite A" (mixture of zinc salt of mercaptobenzothiazole and "Thionex"), etc. Or, we may use a mixture comprising one or more such organic accelerators and an inorganic accelerator such as litharge. We have obtained particularly good results with a mixture containing, by weight, from 0.2 to 0.3 part diphenyl guanidine, from 0.75 to 1.25 parts mercaptobenzothiazole and from 0.5 to 3.0 parts litharge.

In making the new insulating composition especially good results have been obtained with zinc oxide as the accelerator activating agent in an amount, by weight of the whole, ranging from 3 to 5 per cent, and with sulfur as the vulcanizing agent within the limits of 0.5 to 1.0 per cent.

The following is a more specific example of the new product:

| | Per cent by weight |
|---|---|
| Deproteinized or non-deproteinized natural rubber | 40.00 |
| Modified rubber (50% rubber and 50% product of reacting rubber with chlorostannic acid) | 35.00 |
| Asphalt (melting point 300° to 310° F.) | 15.00 |
| Sulfur | 0.75 |
| Vulcanization accelerator | 4.00 |
| Zinc oxide | 3.00 |
| Anti-oxidant | 1.00 |
| Plasticizer | 1.25 |

All of the above components, with the exception of the accelerator and sulfur, are mixed in a suitable mixer as, for example, a Banbury mixer in accordance with conventional rubber compounding practice. The compound preferably is aged for a suitable time, for instance for about 48 hours or more. The accelerator and sulfur are incorporated, prior to use, with the aged compound by any suitable means, for instance on a warming-up mill.

The insulating compositions of the invention may be tubed on a metallic conductor by means of conventional rubber tubing apparatus. It is vulcanized in the usual manner in direct steam vulcanizers. The compound can be cured in a continuous process, or by a pan cure, or by a drum cure with the insulated conductor enclosed or non-enclosed in a lead sheath.

Instead of tubing the insulating composition on the conductor, it may be made in the form of a sheet or tape and a plurality of layers of the same may be applied in tandem to the conductor by means of a strip-covering machine, after which it is vulcanized in place.

With further reference to the drawing, the cable illustrated in Fig. 1 comprises a single conductor 10 which may be, for example, solid or stranded, plain, tinned or enameled copper wire. This conductor is insulated with a covering 11 of the new low loss, high dielectric strength rubber composition previously described. In most cases a protective sheath 12 envelops the whole, but in some instances it may be omitted. This sheath advantageously may take the form of a braid of soft cotton yarn or the like. Such braid may or may not be impregnated with standard flame-proofing and weather-proofing compounds, as desired or as conditions may require.

The cable illustrated in Fig. 2 differs from the cable of Fig. 1 by having a layer or wrapping 14 of conventional insulating material superposed directly on the conductor, and over this a covering of the new rubber composition. The layer 14 conveniently may take the form of a close wrapping of fibrous material such as cotton cloth, paper, etc. The elements designated by the numerals 13, 15 and 16 in Fig. 2 are comparable, respectively, with those designated by the numerals 10, 11 and 12 in Fig. 1. As in the case of the cable shown in Fig. 1, the protective sheath 16 of the cable of Fig. 2 may be omitted for certain applications.

In the cable illustrated in Fig. 3 the conductor 17 and the insulation 18 are comparable to the conductor 10 and the insulation 11 of Fig. 1. The cable construction differs from the cable of Fig. 1 by having a wrapping 19 of a suitable insulating tape material, as for example a rubber-filled tape, over the rubber composition 18. This cable further differs from the cable of Fig. 1 by having a metallic shield, preferably a braided copper shield 20, over the wrapping 19. A protective sheath 21, which may be of lead or other suitable material, surrounds the whole. A cable of this construction is especially adapted for use in high frequency circuits of the order of 150 kilocycles.

Fig. 4 is illustrative of a multi-conductor cable embodying the invention. The cable shown comprises a plurality of conductors 22, preferably having thereon a suitable insulating covering 23, which may be, for instance, an organic enamel. A particularly suitable enamel coating is a resinous composition obtained by reacting an aldehyde, specifically formaldehyde, with a product of hydrolysis of a polyvinyl ester, for example polyvinyl acetate. Over the individual, enameled conductors is applied a covering 24 of the new insulating composition. The conductors are twisted about each other and the cable is made into a firm structure of uniform cross-section with the aid of a suitable filling material 25 as, for example, spun glass, asbestos, jute or the like. Next is applied a wrapping 26 of a suitable insulating binding tape such as a rubber-filled tape, and the whole is enclosed in a sheath 27 formed of lead or the like. The construction of the cable is completed by applying over the lead sheath a plurality of layers 28 and 30 of asphalt or the like, a layer 29 of suitably treated fibrous material such as tarred jute or the like being interposed between the asphalt layers. A suitable armored covering, which may be, for instance, one or more wrappings (two, designated by the numerals 31 and 32, are shown in the drawing) of flat aluminum armor or the like, surrounds the whole. A cable of this type is especially suitable for use as a radio frequency transmission cable for underground installation at airport radio beacon stations, or for various high voltage applications.

Typical physical and electrical test data showing the properties of a vulcanized composition of this invention, specifically a product made as described under Example 1 (tubed on No. 14 solid copper wire, 5/64 inch wall of insulation), are shown below:

Original
   Elongation _____ per cent__600
   Modulus (tensile stress at 200% elongation _____ 400
   Tensile strength in pounds per square inch_____2760

After 48 hours in an oxygen bomb at a pressure of 300 pounds per square inch and a temperature of 69° to 71° C.
   Elongation _____ per cent__600
   Tensile strength in pounds per square inch_____2615

After 120 hours in an oxygen bomb under the same conditions as above described
   Elongation _____ per cent__585
   Tensile strength in pounds per square inch_____2285

After 7 days in a Geer oven at 69° to 71° C.
   Elongation _____ per cent__595
   Tensile strength in pounds per square inch_____2745

Compression cutting test
                          Pounds per 0.1
                          inch thickness
   Original _____ 800
   After 48 hours in an oxygen bomb under the same conditions as above described__ 805
   After 7 days' immersion in distilled water at 69° to 71° C. _____ 930

Mechanical moisture absorption after 7 days' immersion in distilled water at 69° to 71° C.

| | No. 1 | No. 2 | No. 3 |
|---|---|---|---|
| Total absorption (corrected for residue) in milligrams per square inch | 8.96 | 8.74 | 9.02 |

The insulation resistance is of the order of 15,000 megohms per 1000 feet. The insulation resistance K is of the order of 21,700 per 1000 feet. (Insulation resistance tables are based on a constant "K." Resistance in megohms per 1000 feet equals $$K \log_{10} \frac{D}{d}$$

where D equals the diameter of the insulation and d equals the diameter of the conductor.)

The power factor and specific inductive capacitance at 1000 cycles, 10 volts, of a representative sample of the new composition, tubed on a No. 14 solid conductor with 1/8 inch wall of insulation, are shown below:

Specific inductive capacitance
   After 24 hours' immersion in tap water at 69° to 71° C. _____2.88
   After 8 days' immersion _____2.91
   After 15 days' immersion _____2.93
   After 22 days' immersion_____2.95
   After 29 days' immersion_____2.98

Power factor
   After 24 hours' immersion in tap water at 69° to 71° C. _____0.00716
   After 8 days' immersion_____0.00527
   After 15 days' immersion_____0.00536
   After 22 days' immersion_____0.00509
   After 29 days' immersion_____0.00522

The insulating compositions of this invention have no substantial corroding effect upon a copper wire. More particularly it may be stated that when the extent of corrosion is estimated by the gain in resistance of a 0.0063 inch bare copper wire wound around a section of the insulated cable the gain in resistance after heating in humidified air at 69° to 71° C. for 7 days is only about 0.6 to 1.1 per cent of the initial resistance.

The above tests are made in accordance with the methods more fully described in, for example, United States Coast Guard Master Specifications No. S–219–37, "Inspection and testing of rubber insulated cables," dated June 1, 1937.

Electrical cables embodying the present invention meet the physical and electrical requirements specified in the following United States Coast Guard Specifications: S–204–35; S–205–35; S–206–35; S–212–35; S–214–35; S–216–35; S–220–37; S–223–35; S–224–35; S225–35; S–226–37; and S–227–37. Likewise the new insulation composition has properties which meet, and generally are materially above, the minimum requirements for rubber insulation specified in U. S. Coast Guard Master Specifications S–218–37 and S–221–37 of June 1, 1937. In all cases where water absorption is a determining factor in the life of the cable, a composition comprising deproteinized rubber and deproteinized "modified rubber" (as herein defined) are used. The rubber insulation of this invention has a low dielectric constant and power factor, and therefore low power losses. It has low water absorption properties, being even lower when deproteinized rubber is employed in preparing the compound. It has good physical and aging characteristics.

It will be obvious to those skilled in the art that various modifications of this invention are possible. For example, under certain conditions it may be desirable to apply a conventional rubber or equivalent covering directly to the conductor, followed by one or more layers of the new insulating composition, with or without intervening layers of fibrous or other insulating material. Also, if desired, the rubber composition may be used as an outer sheath or jacket in place of a conventional protective sheath, or it may be used to encase a plurality of insulated conductors, for example in lieu of the rubber-filled tape 26 shown in Fig. 4. Likewise various modifications may be made in the arrangement of the other elements of the cable structure. For instance, in multi-conductor submarine telephone communication cables the single conductors may be shielded with copper or brass tape and the overall armor may be made of several strands of heavy steel wire.

What we claim as new and desire to secure by Letters Patent of the United States is:

1. An insulated electrical conductor in which the insulation comprises a product of vulcanizing an extrudable composition comprising rubber, asphalt, a reaction product of rubber and a halogen acid of tin, and a vulcanizing agent.

2. An electrical cable comprising an electrical conductor with insulation thereon comprising the product of vulcanizing an extrudable composition comprising at least 50 per cent by weight of rubber, a vulcanizing agent, a vulcanization accelerator, an accelerator activating agent, asphalt, and a reaction product of rubber and a chlorine acid of tin, said reaction product not exceeding substantially 60 per cent by weight of the rubber.

3. An electrical cable comprising an electrical conductor with insulation thereon comprising the vulcanized product of

| | Per cent by weight |
|---|---|
| Rubber | 50 to 65 |
| Reaction product of rubber and halogen acid of tin | 25 to 10 |
| Sulfur | 0.5 to 2 |
| Asphalt | 5 to 20 |
| Vulcanization accelerator | Up to 5 |
| Accelerator activating agent | Up to 7 |
| Anti-oxidant | Up to 2 |
| Plasticizer | Up to 5 |

4. An electrical cable comprising a metallic conductor, an outer protective sheath, and between the said sheath and the said conductor a covering composed of the vulcanized product of

| | Per cent by weight |
|---|---|
| Rubber | 50 to 65 |
| Reaction product of rubber and halogen acid of tin | 25 to 10 |
| Sulfur | 0.5 to 2 |
| Asphalt | 5 to 20 |
| Vulcanization accelerator | Up to 5 |
| Accelerator activating agent | Up to 7 |
| Anti-oxidant | Up to 2 |
| Plasticizer | Up to 5 |

5. An electrical cable comprising a metallic conductor, a covering of conventional insulating material superposed directly on the said conductor, an outer protective sheath, and between the said sheath and the said covering a layer of insulation comprising the vulcanized product of

| | Per cent by weight |
|---|---|
| Rubber | 50 to 65 |
| Reaction product of rubber and chlorine acid of tin | 25 to 10 |
| Sulfur | 0.5 to 2 |
| Asphalt | 5 to 20 |
| Vulcanization accelerator | Up to 5 |
| Accelerator activating agent | Up to 7 |
| Anti-oxidant | Up to 2 |
| Plasticizer | Up to 5 |

6. An electrical cable comprising a metallic conductor, a low loss, high dielectric strength rubber composition superposed directly on the said conductor, said rubber composition being the vulcanized product of

| | Per cent by weight |
|---|---|
| Rubber | 50 to 65 |
| Reaction product of rubber and chlorostannic acid | 25 to 10 |
| Sulfur | 0.5 to 2 |
| Asphalt | 5 to 20 |
| Vulcanization accelerator | Up to 5 |
| Accelerator activating agent | Up to 7 |
| Anti-oxidant | Up to 2 |
| Plasticizer | Up to 5 | a wrapping of insulating tape over the said rubber composition, an outer protective sheath, and a metallic shield between the said sheath and the said wrapping.

7. An electrical cable comprising a plurality of enameled metallic conductors, each of said conductors being further insulated by having superposed thereon a low loss, high dielectric strength rubber composition which is the vulcanized product of

| | Per cent by weight |
|---|---|
| Rubber | 50 to 65 |
| Reaction product of rubber and chlorostannic acid | 25 to 10 |
| Sulfur | 0.5 to 2 |
| Asphalt | 5 to 20 |
| Vulcanization accelerator | Up to 5 |
| Accelerator activating agent | Up to 7 |
| Anti-oxidant | Up to 2 |
| Plasticizer | Up to 5 | filling material disposed about the said insulated conductors to form a firm structure of circular cross-section, a binding tape over the said filling material and insulated conductors, a lead sheath over the binding tape, an outer metallic armor, and masses of asphalt and treated fibrous material between the said sheath and the said armor.

8. A low loss, high dielectric strength insulating material which is the product of vulcanizing an extrudable composition comprising rubber, asphalt, a reaction product of rubber and a halogen acid of tin, and a vulcanizing agent.

9. A low loss, high dielectric strength insulating material which is the vulcanized product of

| | Per cent by weight |
|---|---|
| Rubber | 50 to 65 |
| Reaction product of rubber and halogen acid of tin | 25 to 10 |
| Sulfur | 0.5 to 2 |
| Asphalt | 5 to 20 |
| Vulcanization accelerator | Up to 5 |
| Accelerator activating agent | Up to 7 |
| Anti-oxidant | Up to 2 |
| Plasticizer | Up to 5 |

10. An insulating composition of high dielectric strength and of low water-absorption characteristics, said composition being the vulcanized product of

| | Per cent by weight |
|---|---|
| Deproteinized rubber | 50 to 65 |
| Deproteinized reaction product of rubber and halogen acid of tin | 25 to 10 |
| Sulphur | 0.5 to 2 |
| Asphalt | 5 to 20 |
| Vulcanization accelerator | Up to 5 |
| Accelerator activating agent | Up to 7 |
| Anti-oxidant | Up to 2 |
| Plasticizer | Up to 5 | said composition in unvulcanized state being adapted for extrusion upon a conducting core at a temperature of the order of 175° to 225° F.

11. A low loss, high dielectric strength insulating material which is the product of vulcanizing an extrudable composition comprising a vulcanizing agent, at least 50 per cent by weight rubber, not execeeding substantially 20 per cent by weight asphalt having a melting point of the order of 260° to 350° F. and a reaction product of rubber and a halogen acid of tin, said reaction product being present in an amount not exceeding substantially 60 per cent by weight of the rubber.

12. An insulating material as in claim 9 wherein the reaction product of rubber and halogen acid of tin is the reaction product of rubber and chlorinated acid of tin.

13. An insulating material as in claim 9 wherein the reaction product of rubber and halogen acid of tin is the reaction product of rubber and chlorostannic acid.

14. An insulating material as in claim 9 wherein the reaction product of rubber and halogen acid of tin is the reaction product of rubber and chlorostannous acid.

15. An insulating composition as in claim 10 wherein the deproteinized reaction product of rubber and halogen acid of tin is the deproteinized reaction product of rubber and chlorinated acid of tin.

16. An electrically insulating material comprising the product of vulcanization of a composition that is extrudable upon a conducting core at temperatures of the order of 175° to 225° F. and which comprises a vulcanizing agent, at least 50 per cent by weight rubber, at least 5 per cent by weight asphalt and a reaction product of rubber and chlorinated acid of tin in an amount not exceeding substantially 60 per cent by weight of the rubber.

17. An electrically insulating material which is the product of heat treating at vulcanization temperature an extrudable composition comprising a vulcanizing agent, at least 50 per cent by weight of rubber, from 5 to 20 per cent by weight asphalt, and a reaction product of rubber and chlorinated acid of tin, said reaction product being present in an amount less than 50 per cent by weight of the rubber.

18. An electrically insulating material as in claim 17 wherein the rubber component is deproteinized rubber and the reaction product of rubber and chlorinated acid of tin is the deproteinized reaction product of rubber and chlorinated acid of tin.

MANUEL H. SAVAGE.
EDMUND J. BUTLER.